(12) United States Patent
de Vries

(10) Patent No.: US 7,643,837 B2
(45) Date of Patent: Jan. 5, 2010

(54) CONTROLLING RECONFIGURATION IN A CELLULAR COMMUNICATION SYSTEM

(75) Inventor: Martin de Vries, Hellendoorn (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 443 days.

(21) Appl. No.: 10/596,777

(22) PCT Filed: Dec. 23, 2003

(86) PCT No.: PCT/EP03/14809

§ 371 (c)(1),
(2), (4) Date: Jun. 23, 2006

(87) PCT Pub. No.: WO2005/064970

PCT Pub. Date: Jul. 14, 2005

(65) Prior Publication Data

US 2007/0149226 A1    Jun. 28, 2007

(51) Int. Cl.
*H04B 7/00* (2006.01)

(52) U.S. Cl. .................................. 455/502; 370/345

(58) Field of Classification Search .............. 455/436, 455/502; 370/331, 335, 278
See application file for complete search history.

(56) References Cited

U.S. PATENT DOCUMENTS

| | | | |
|---|---|---|---|
| 6,570,872 B1 | 5/2003 | Beshai et al. | |
| 6,810,019 B2 * | 10/2004 | Steudle | 370/252 |
| 6,868,075 B1 * | 3/2005 | Narvinger et al. | 370/335 |
| 6,892,071 B2 * | 5/2005 | Park et al. | 455/436 |
| 7,020,108 B2 * | 3/2006 | Virtanen | 370/331 |
| 7,146,167 B2 * | 12/2006 | Tanabe | 455/436 |
| 7,190,944 B2 * | 3/2007 | Kim et al. | 455/346 |
| 7,376,424 B2 * | 5/2008 | Kim et al. | 455/436 |
| 2003/0003919 A1 | 1/2003 | Van Lieshout et al. | |
| 2003/0108027 A1 * | 6/2003 | Kim et al. | 370/345 |
| 2003/0185159 A1 | 10/2003 | Kwak et al. | |
| 2004/0009767 A1 * | 1/2004 | Lee et al. | 455/422.1 |
| 2004/0156324 A1 * | 8/2004 | Steudle | 370/278 |

FOREIGN PATENT DOCUMENTS

EP    1 137 203 A    9/2001

* cited by examiner

*Primary Examiner*—Lester Kincaid
*Assistant Examiner*—Isaak R Jama

(57) ABSTRACT

In a cellular communication system, for example UMTS using WCDMA, a configuration of radio links is controlled. In a mobile unit, and in a base station, a synchronization counter indicates time codes (CFN) for synchronization of configuration changes across the system. Messages are exchanged between a network controller, the base stations and the mobile units, which messages include a change command (62) for changing a configuration, and a reconfiguration command (61) for changing a current configuration state to a next configuration state at a selected future time code (63). Traditionally a prepared reconfiguration period (67) for such a reconfiguration change was treated as a blocking period for further changes. According to the invention the prepared reconfiguration period is determined, and a prepared reconfiguration period indicator (66) is added to the change command. Hence other configuration changes can be effected during the prepared reconfiguration period.

16 Claims, 7 Drawing Sheets

| IE/Group Name | Presence | Range | IE type and reference | Semantics description | Criticality | Assigned Criticality |
|---|---|---|---|---|---|---|
| ...... | | | | | | |
| ..... | | | | | | |
| ...... | | | | | | |
| Transaction ID | M | | | | – | |
| UL DPCH Information | | 1 | | | YES | reject |
| DL DPCH Information | | 1 | | | YES | reject |
| DCH Information | M | | | | YES | reject |
| DSCH Information | O | | | | YES | reject |
| ........ | | | | | | |
| RL Information | | 1 to <maxnoof RLs> | | | EACH | notify |
| Transmission Gap Pattern Sequence Information | O | | | | YES | reject |
| Active Pattern Sequence Information | O | | | | YES | reject |
| Start CFN – RECONFIG | C-CPM | | | | | |
| Stop CFN – RECONFIG | C-CPM | | | | | |

81 — Start CFN – RECONFIG
82 — Stop CFN – RECONFIG

| Condition | Explanation |
|---|---|
| C-CPM | either IE 'start CFN' or IE 'stop CFN' can be present not both |

83 — C-CPM

FIG. 8

CONTROLLING RECONFIGURATION IN A CELLULAR COMMUNICATION SYSTEM

BACKGROUND OF THE INVENTION

Cellular communication systems are widely known for mobile communication, for example in the GSM telecommunication system and the UMTS system. The UMTS system is a wideband code division multiple access (WCDMA) system according to an ITU standard derived from code-division multiple access (CDMA), and is officially known as IMT-2000 direct spread. WCDMA is a third-generation (3G) mobile wireless technology offering much higher data speeds to mobile and portable wireless devices than commonly offered in today's market. WCDMA can support mobile/portable voice, images, data, and video communications at up to 2 Mbps (local area access) or 384 Kbps (wide area access). The input signals are digitized and transmitted in coded, spread-spectrum mode over a broad range of frequencies. A 5 MHz-wide carrier is used, compared with 200 kHz-wide carrier for narrowband CDMA. Further detailed description of the WDCMA system can be found in the (proposed) technical standardization documents for the UMTS system, e.g. in the document NBAP TS 25.433 available from the website of the 3G partnership project (http://www.3gpp.org/).

An example of configuration control in a radio network telecommunication system is known from the patent application WO01/41492. A telecommunications system employing WCDMA technology is described, which utilizes compressed mode techniques to allow a mobile station to take measurements on another frequency in preparation for inter-frequency transfer. The configuration of the radio links, i.e. the selected transmission mode, coding, frequency, bandwidth, etc., has to be known both to the transmitter and to the receiver. For controlling the configuration of the radio links the assumption was that the compressed mode characteristics in a transmission slot were controlled by the network, but such control leads to problems when one considers that the slot characteristics are very dependent upon the mobile station characteristics. In the document, the control of the slot specifications are dictated by the mobile station to the network and acknowledged by the network to the mobile station. Thereafter, the network informs the WCDMA base station of the slot specifications, which are then imposed from the WCDMA base station to the mobile station. Once the mobile station receives the slot from the WCDMA base station, the mobile station is confident that the slot will conform to the characteristics that the mobile station needs in order to make the appropriate measurements.

It is to be noted that in general configuration changes, for example adding a radio link, may be effected directly by issuing change commands. However, for complex changes of the configuration such as compressed mode, there is a need for a time interval between the network deciding that a next configuration state is to be set, and the actual activation of the next configuration. In particular several involved communication elements (mobile units and/or base stations), which are operating according to a current configuration state, need to be informed of the upcoming change, because they need some time to prepare for the next configuration state.

In the existing UMTS system, there is, according to NBAP TS 25.433, provided a reconfiguration process to engage a next configuration state at a selected future time. A synchronization time counter is maintained in the communication elements, indicating time codes for synchronizing configuration changes and further time-dependent functions. However, after the involved communication elements have been informed about the reconfiguration process, further configuration changes, which relate to communication elements in the system that are not aware of the reconfiguration process, have to be postponed until after said selected future time.

SUMMARY OF THE INVENTION

Therefore it is an object of the invention to provide reconfiguration control in the cellular communication system that flexibly allows further changes during the reconfiguration process.

According to a first aspect of the invention the object is achieved with a method as described in the opening paragraph, the method comprising determining a prepared reconfiguration period, which period starts at a transmission time code of the reconfiguration command, and ends at the selected future time code, and adding a prepared reconfiguration period indicator to the change command.

According to a second aspect of the invention the object is achieved with a method of controlling a mobile unit in a cellular communication system as described in the opening paragraph, the system being arranged for determining a prepared reconfiguration period, which period starts at a transmission time code of the reconfiguration command, and ends at the selected future time code, and the change command comprising a prepared reconfiguration period indicator, and the method further comprising detecting the prepared reconfiguration period indicator from the change command, and, in the event that the future selected time code has not yet passed, subsequently at the future selected time code setting the configuration according to the next configuration.

According to a third aspect of the invention the object is achieved with a method of controlling a base station in a cellular communication system as described in the opening paragraph, the system being arranged for determining a prepared reconfiguration period being, which period starts at a transmission time code of the reconfiguration command, and ends at the selected future time code, and the change command comprising a prepared reconfiguration period indicator, the method further comprising detecting the prepared reconfiguration period indicator from the change command, and, in the event that the future selected time code has not yet passed, subsequently at the future selected time code setting the configuration according to the next configuration.

According to a fourth aspect of the invention the object is achieved with a mobile unit for use in a cellular communication system as described in the opening paragraph, the system being arranged for determining a prepared reconfiguration period, which period starts at a transmission time code of the reconfiguration command, and ends at the selected future time code, and the change command comprising a prepared reconfiguration period indicator, the mobile unit further comprising reconfiguration means for detecting the prepared reconfiguration period indicator from the change command, and for, in the event that the future selected time code has not yet passed, subsequently at the future selected time code setting the configuration according to the next configuration.

According to a fifth aspect of the invention the object is achieved with a device for controlling a base station in a cellular communication system as described in the opening paragraph, the system being arranged for determining a prepared reconfiguration period, which period starts at a transmission time code of the reconfiguration command, and ends at the selected future time code, and the change command comprising a prepared reconfiguration period indicator, the device further comprising reconfiguration means for detecting the prepared reconfiguration period indicator from the change command, and, in the event that the future selected time code has not yet passed, subsequently at the future selected time code setting the configuration according to the next configuration.

The effect of the measures is that communication elements in the radio network that are receiving the change commands are aware of the upcoming reconfiguration, and are enabled to monitor the prepared reconfiguration period using the synchronization counter. This has the advantage that change commands can be issued at any time to any communication element in the network, irrespective of an ongoing reconfiguration process between already involved communication elements. This is in particular advantageous if a new communication element is to be included in an existing radio link configuration, for example a base station to be added while a communication radio link between a mobile unit and a different base station is already established and in a reconfiguration process.

The invention is also based on the following recognition. Currently cellular telecommunication systems accept that during a reconfiguration process a number of operations is blocked, or at least delayed, until the reconfiguration is completed. The inventor has seen that such a blocking period decreases the performance of the communication system, in particular in dense traffic conditions when a substantial number of reconfigurations are to be performed. For increasing the performance the blocking period is obviated by allowing an overlap of the prepared reconfiguration period and other changes to the configuration. By adding the prepared reconfiguration period indicator any communication device engaging in the other change is made aware of an ongoing reconfiguration process, and is enabled to act accordingly.

In an embodiment of the mobile unit the reconfiguration means are arranged for, in the event that the future selected time code has not yet passed, executing the change command according to the current configuration, and for, in the event that the future selected time code has passed, executing the change command according to the next configuration. This has the advantage that the change command is executed without delay, and according to the configuration corresponding to the configuration actually involved in the reconfiguration process.

In an embodiment of the method the synchronization counter has a synchronization cycle indicated by a limited number of the time codes, and the change command comprises a reference time code for providing a passed reference time in the synchronization cycle, and the prepared reconfiguration period indicator is indicating that the reference time code is indicating the selected future time code. This has the advantage that the reference time code serves a dual purpose, i.e. first a reconfiguration time indicator during the prepared reconfiguration period, and secondly the reference time code after the prepared reconfiguration period.

In an embodiment of the method the prepared reconfiguration period indicator comprises the transmission time code. The transmission time code is effectively always passed, because it indicates the time code at which the reconfiguration process has been started by the reconfiguration command. This has the advantage that the communication element that received the change command, can easily verify whether the current synchronization time code is between the transmission time code and the future selected time code.

In an embodiment of the mobile unit the synchronization counter has a synchronization cycle indicated by a limited number of the time codes, and the change command comprises a reference time code for providing a passed reference time in the synchronization cycle, and the prepared reconfiguration period indicator is indicating that the reference time code is indicating the selected future time code, and the reconfiguration means are arranged for, in order to detect whether a current time code has passed the future selected time code, detecting whether the current time code is in a part of the synchronization cycle covered by the prepared reconfiguration period. Effectively the synchronization counter wraps to a zero time code at the end of the synchronization cycle. Hence the mobile unit needs to resolve whether a specific time code (e.g. the reference time code) is in the future or in the past. If the prepared reconfiguration period indicator is indicating that the reference time code is indicating the selected future time code, the message may still be received shortly after the time code corresponding to the future selected time code. Advantageously, in this event, the mobile unit is aware that the next configuration has already been activated. In practice the transmission delay will be short in relation to the synchronization cycle. A predefined part of the synchronization cycle, for example 25%, may be defined as the maximum period for deciding that the future selected time code already has passed.

In an embodiment of the method the prepared reconfiguration period indicator is selectively added to the change command in the event that a change command is to be transferred in the prepared reconfiguration period. In a further embodiment of the method the prepared reconfiguration period indicator is selectively added to the change command for a mobile unit or base station not involved in the configuration change when issuing the reconfiguration command. This has the advantage that the change command is not unduly burdened with a reconfiguration process indicator relating to an already completed reconfiguration.

Further preferred embodiments of the method and device according to the invention are given in the further claims.

BRIEF DESCRIPTION OF THE SEVERAL VIEWS OF THE DRAWINGS

These and other aspects of the invention will be apparent from and elucidated further with reference to the embodiments described by way of example in the following description and with reference to the accompanying drawings, in which FIG. 5 shows examples of a reconfiguration of the compressed mode, FIG. 8 shows a prepared reconfiguration period indicator in a change message.

In the Figures, elements which correspond to elements already described have the same reference numerals.

DETAILED DESCRIPTION OF THE INVENTION

Figure 1:
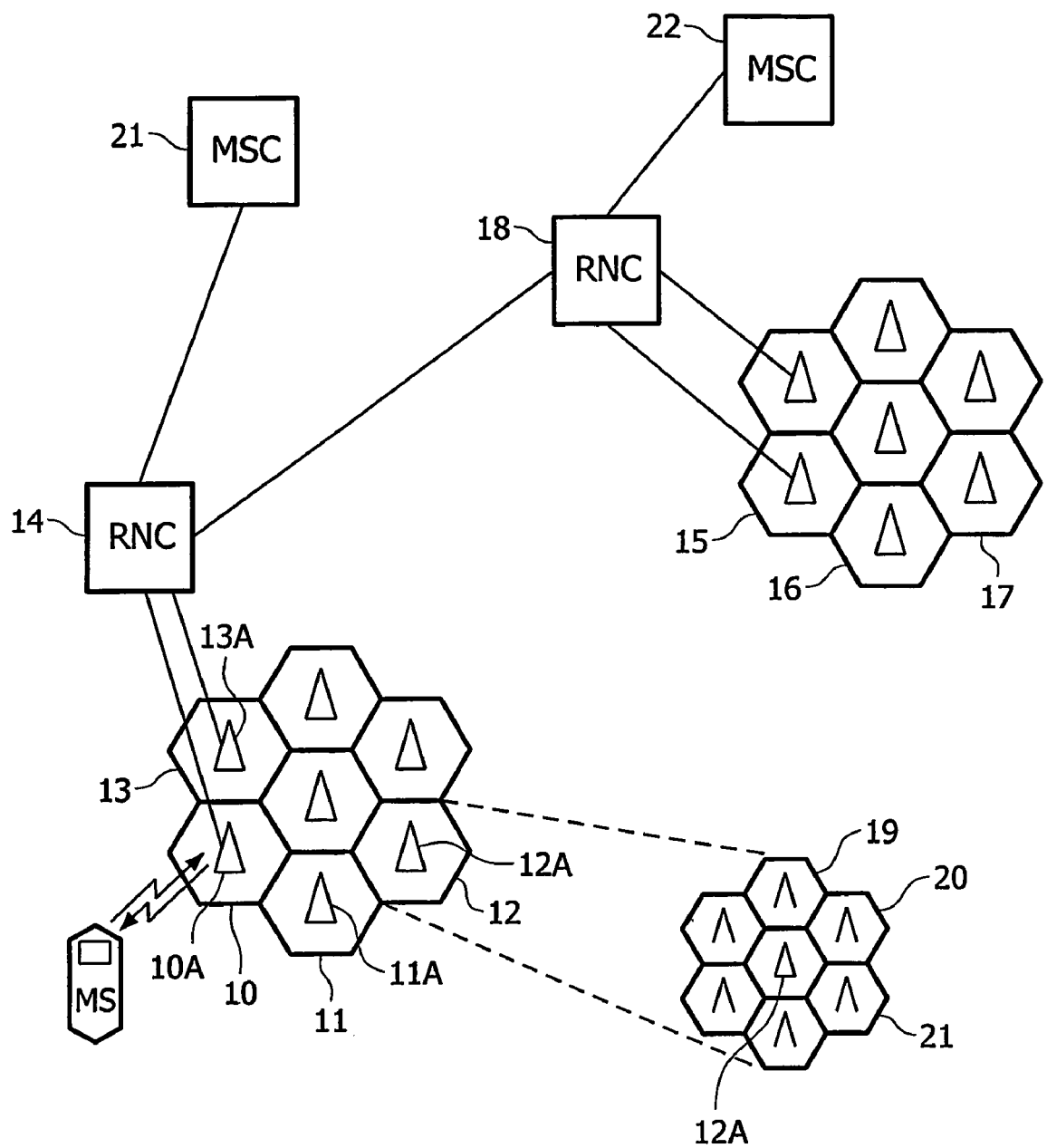
FIG. 1 shows a simplified schematic view of a cellular communication system.

FIG. 1 shows a simplified schematic view of a cellular system into which the present invention may be incorporated. In mobile telecommunications, a mobile station (MS) such as a mobile telephone communicates over radio channels with base stations. Each base station usually transmits and receives signals over selected radio channels for a particular geographic region known as a cell. The cell often is subdivided into several sectors. Typically a plurality of base stations are connected to a base station controller node, also known as an exchange or a radio network controller node (RNC). One or more RNCs are, in turn, connected to or included with a mobile switching center (MSC). The mobile switching center is usually connected, e.g., via a gateway, to other telecommunication networks, such as the public switched telephone network or to a packet-data network such as the Internet.

In FIG. 1, the mobile station MS communicates via base station 10A within a geographic cell location 10 as the mobile station MS travels within the cell 10. Geographic areas are defined by further cells 11, 12, 13, etc., each serviced by respective base stations 11A, 12A, 13A, etc. The base stations 10A-13A communicate with a radio network core RNC 14, which may communicate with other radio network cores 18 and mobile services switching centers 21. A geographic area will be defined by multiple groups of cells serviced by different radio network cores 14 and 18. Thus, additional cells 15, 16, 17, etc. will be serviced by a different radio network core 18, which in turn is serviced by another mobile services switching center 22.

Even within particular cells 12, the geographic region may be further sub-divided into so-called sectors 19, 20, 21, etc. Thus, base station 12A may employ directional antennas to define certain sectors within the cell 12 in order to define the various sectors 19-21.

As the mobile station MS roams from cell to cell, the mobile station communications will be handed over from one base station to another, for example from base station 10A to base station 11A. As this occurs, the radio network core 14 supervises the handover operation, which is conducted upon initiation of, for example, measurements taken by the mobile station MS and/or the base stations 10A, 11A, 12A, etc. Once the measurements are taken, a determination is made as to whether the mobile station would be better serviced under the current conditions by a different base station.

It is not uncommon for mobile stations to roam outside of a cellular service area into a new cellular service area which is accommodated by a wholly different cellular communications scheme.

In a (wideband) code division multiple access (W-CDMA) mobile telecommunications system, the information transmitted between a base station and a particular mobile station is modulated by a mathematical code (such as spreading code) to distinguish it from information for other mobile stations which are utilizing the same radio frequency. Thus, in WCDMA each mobile radio employs its own unique code sequence to encode its data signal. The receiver, knowing the code sequences of the mobile radio it services, decodes the received signal to recover data from each radio.

The WCDMA encoding process enlarges the spectrum of the signal and is therefore known as spread-spectrum modulation. The resulting signal is also called a spread-spectrum signal, and WCDMA is often denoted as spread-spectrum multiple access. The spectral spreading of the transmitted signal gives to WCDMA its multiple access capability. That is, if multiple radios transmit a spread-spectrum signal at the same time, the receiving station will still be able to distinguish between the radios because each user has a unique code that has a sufficiently low cross-correlation with other codes used simultaneously by other radios.

Correlating the received signal with a code signal from a certain radio despreads the signal from that radio, while the other spread-spectrum signals will remain spread over a large bandwidth. Thus, after decoding a signal from a particular radio within the information bandwidth, the power of the desired radio signal will be larger than the interfering power of the other radios. With that power discrepancy, the desired signal can be extracted.

In a WCDMA system, power control is very important. In the uplink direction, the requirement for power control arises because of the possibility for multiple access interference. All radios in a cell using a WCDMA system transmit their data using the same bandwidth at the same time as other radios in that cell. Further, in a WCDMA system the neighboring cell frequencies are the same as in a given cell. So interference can be seen into neighboring cells, causing capacity degradation. In such a system, it is inevitable that radios will interfere with one another. Signals received by the base station from a radio close to the base stations, for example, will be stronger than signals received from radios located at a cell boundary. Distant radios will thus tend to be dominated by close ones. To maintain capacity, all signals, regardless of distance, arrive at the base station with the same mean power by controlling the radios to achieve a constant received mean power for each user.

In contrast to the uplink, in the downlink all signals from a base station propagate through the same channel and thus are received by a mobile station with equal power. Power control on the downlink is not required to eliminate the near-far problem, but is required to minimize or offset interference with neighboring cells.

These power controls require certain measurements of signal strength, signal loss characteristics, etc. to be taken. In some cases, the mobile radio participates in obtaining those measurements.

The mobile radio measurements are also be used to evaluate soft, softer and hard handovers. In soft handover a mobile station is connected to more than one base station simultaneously. Softer handover is a soft handover between two sectors of a cell. A mobile station performs a hard handover when the signal strength of a neighboring cell exceeds the signal strength of the current cell within a given threshold.

In order to avoid the various forms of interference, instantaneous handovers occur between cells, sectors, and base stations as needed when the signal strength after the change would exceed the signal strength of the current conditions and to allow the mobile station to connect into a cell from which it receives a signal with the highest power (i.e., with the lowest path loss). For example, a mobile station may enter a soft handover when the signal strength of neighboring cell exceeds a certain threshold but is still below the current base station's signal strength.

Further, mobile station comparative measurements are taken to optimize a mobile radio's transmissions when multiple frequency carriers exist in a cell. This exists, as an example, in hierarchical cell structures where micro cells will have a different frequency than the macro cell overlaying the micro cell. For those inter-frequency handovers, the mobile station has to be able to measure the signal strength and quality of another carrier frequency, while still maintaining the connection in the current carrier frequency. Since a WCDMA transmission is continuous, there are ordinarily no idle slots for the inter-frequency measurement to occur.

As described above, from time to time, a mobile station communicating with a base station in WCDMA mode receives a continuous WCDMA transmission from the base station at a particular frequency. In hierarchical and other types of systems, the mobile stations may need to take measurements on other frequencies to determine whether a handover (soft, softer, or hard) may be appropriate.

Figure 2:
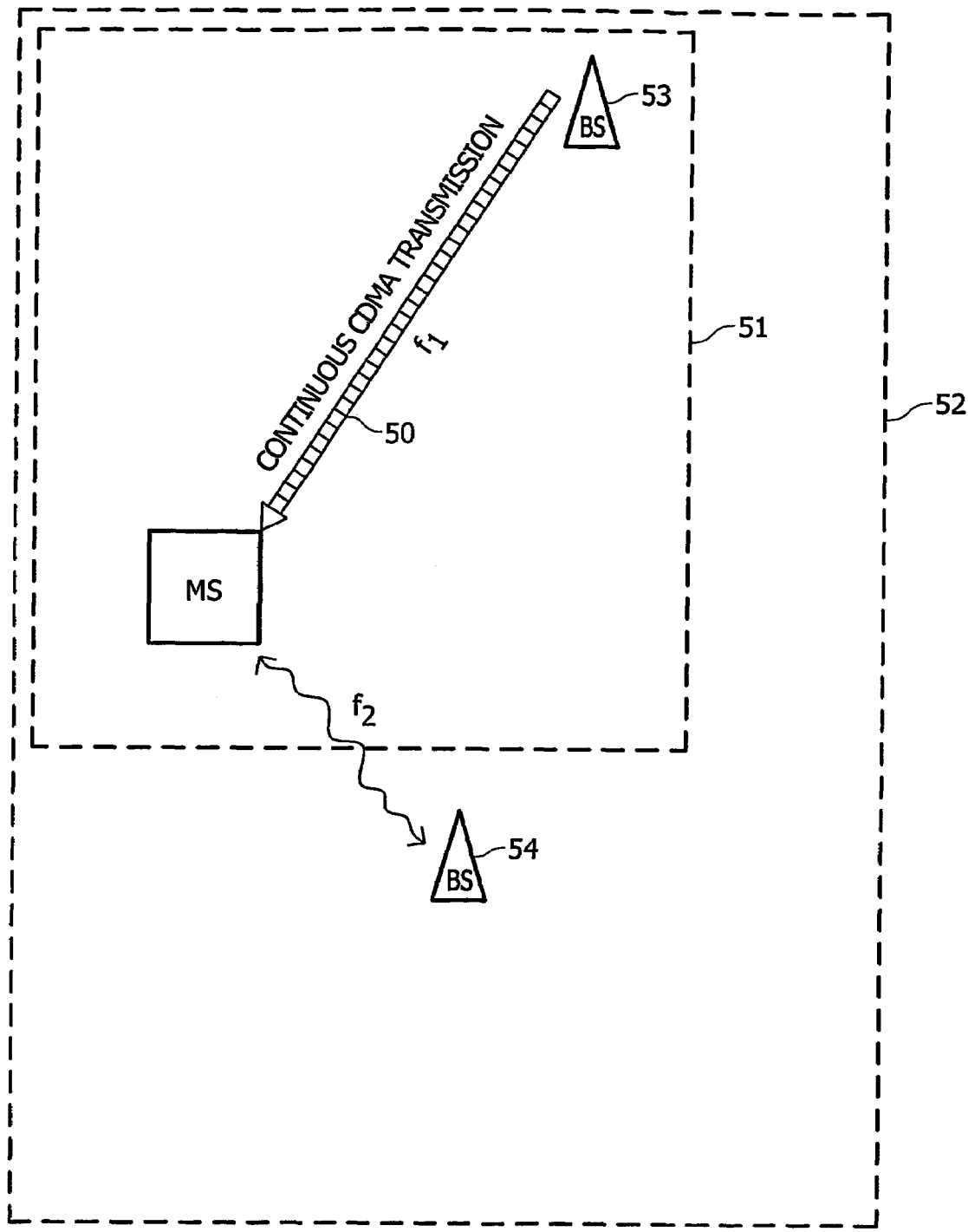
FIG. 2 shows a simplified schematic representation of WCDMA transmission.

FIG. 2 shows a simplified schematic representation of WCDMA transmission. In FIG. 2, an hierarchical structure is shown in which geographic area 51 is shown as a local area serviced by base station 53, within a larger geographic area 52 serviced by base station 54. In FIG. 2, the mobile station MS is in continuous WCDMA communication with base station 53 and is receiving a continuous WCDMA transmission stream of frames at frequency f1. The transmission frames are indicated by element 50 from base station 53 to mobile station MS. In the embodiment of FIG. 2, the WCDMA transmission is shown for illustrative purposes on the downlink, but the present invention has application on the uplink and simultaneously on the uplink/downlink as well.

A problem in FIG. 2 arises when the mobile station MS moves to the cell boundary of the area 51 and is instructed to take measurements from base station 54. If, the mobile station MS does not have dual receiver (mode) capability, it is in a dilemma. It has been instructed to take measurements on frequency f2, but it is receiving a continuous stream of WCDMA transmissions on frequency f1, which is continuously occupying the single receiver resources of the mobile station MS. In such a single mode mobile station, the compressed mode capability shown and described with respect to FIG. 3 can be employed.

Figure 3:
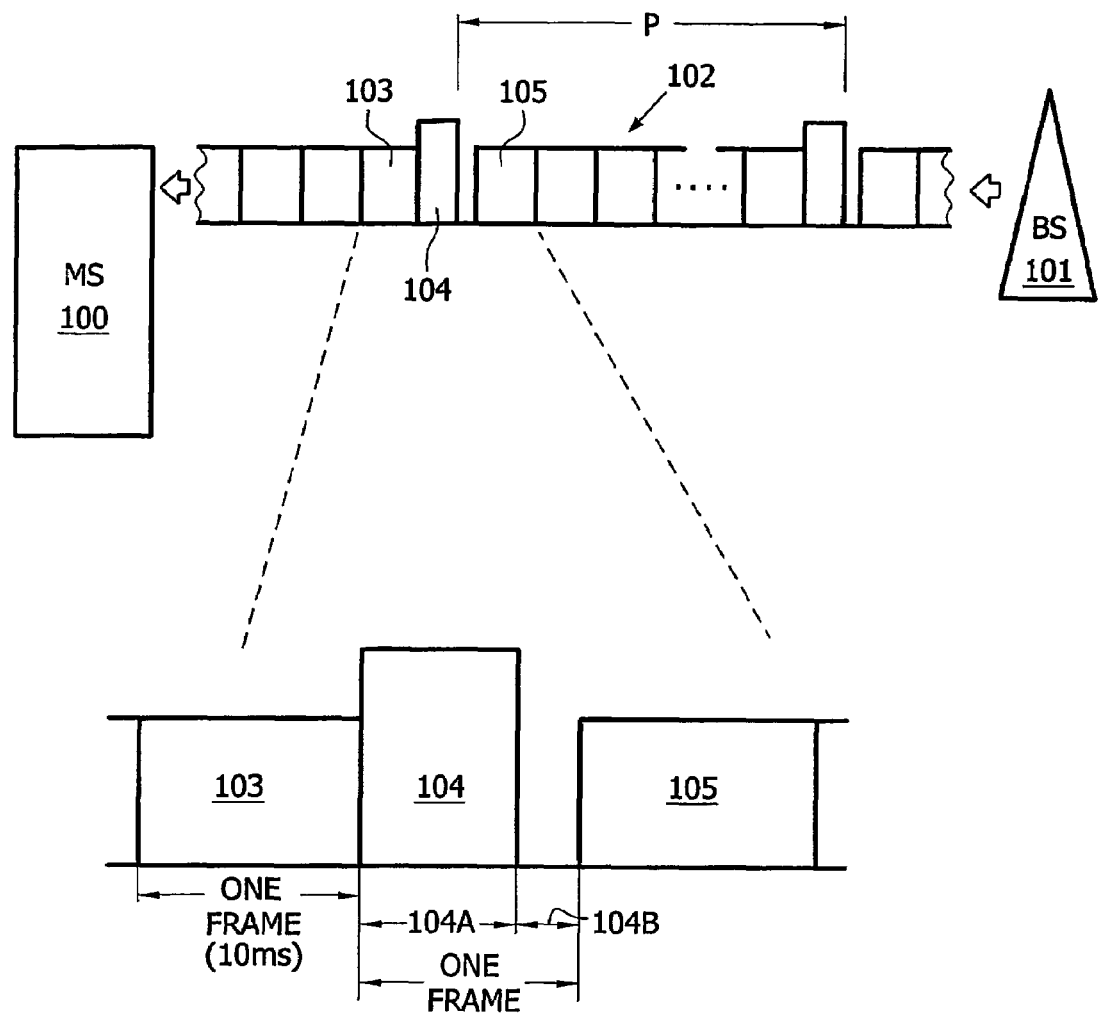
FIG. 3 shows a schematic representation of a compressed mode.

FIG. 3 shows a schematic representation of a compressed mode. In FIG. 3, the mobile station 100 is receiving the continuous stream of WCDMA transmissions from base station 101. The continuous stream of frames 102 is again shown for illustrative purposes on the downlink from base station 101 to mobile station 100. Ordinarily, the mobile station 100 would receive a stream of frames of uniform dimension over time. In the compressed mode, however, the base station 101 compresses the information in slot 104 in order to create a slot of interrupted, spare, space in the otherwise continuous WCDMA transmission. Thus, as shown in the enlargement at the bottom of FIG. 3, mobile station 100 receives frame 103, which is one frame length (10 milliseconds in WCDMA) followed by a compressed frame 104 having a frame duration 104A. The remaining time within the "one frame" time allotted for the data in frame 104 is shown as the slot 104B. After the slot, a next frame 105 of typical duration is shown. The base station 101 can provide the slot 104B as a single event to the mobile station 100, or (as shown in FIG. 3), the slots may repeat every period P.

For example, in the compressed mode (referring back to FIG. 2) the mobile station MS, which is receiving the otherwise continuous WCDMA transmission 50, requires an interruption to take measurements from the base station 54. The interruption for that measurement is identified as the slot that occurs at the junction between 104 and 105. Thus, mobile station 100 receives frame 103 at frequency f1, followed by compressed frame 104 at frequency f1. Immediately thereafter, mobile station 100 switches to receive a transmission from a second base station (corresponding to base station 54 in FIG. 2) and takes in information from the second base station during the slot period between frames 104 and 105. The mobile station 100 now has received the transmission of the second base station upon which appropriate measurements can be taken and a handover determination can be made. Meanwhile, the base station 101 continues to provide the mobile station 100 with the WCDMA transmission interrupted only by the slots 104B (either as a one time event or as a periodic event).

It is noted that compressed mode example described above is an example of a configuration of the radio links in the communication system. Further examples of configurations may involve a compressed mode for a number of base stations, for a specific code in a radio link, or a subset of codes in the radio link, and choices of frequency, channel configuration, bandwidth or time division multiplex modes, etc. In general the configuration of the radio links must be set up and prepared by all involved communication elements (mobile units, base stations, network controllers, etc), and has to be engaged at a same instant in time. Thereto a synchronization counter is embedded in the communication elements, which counter produces time codes called configuration frames numbers (CFN). Such a controlled change of configuration is called a reconfiguration process.

Figure 4:
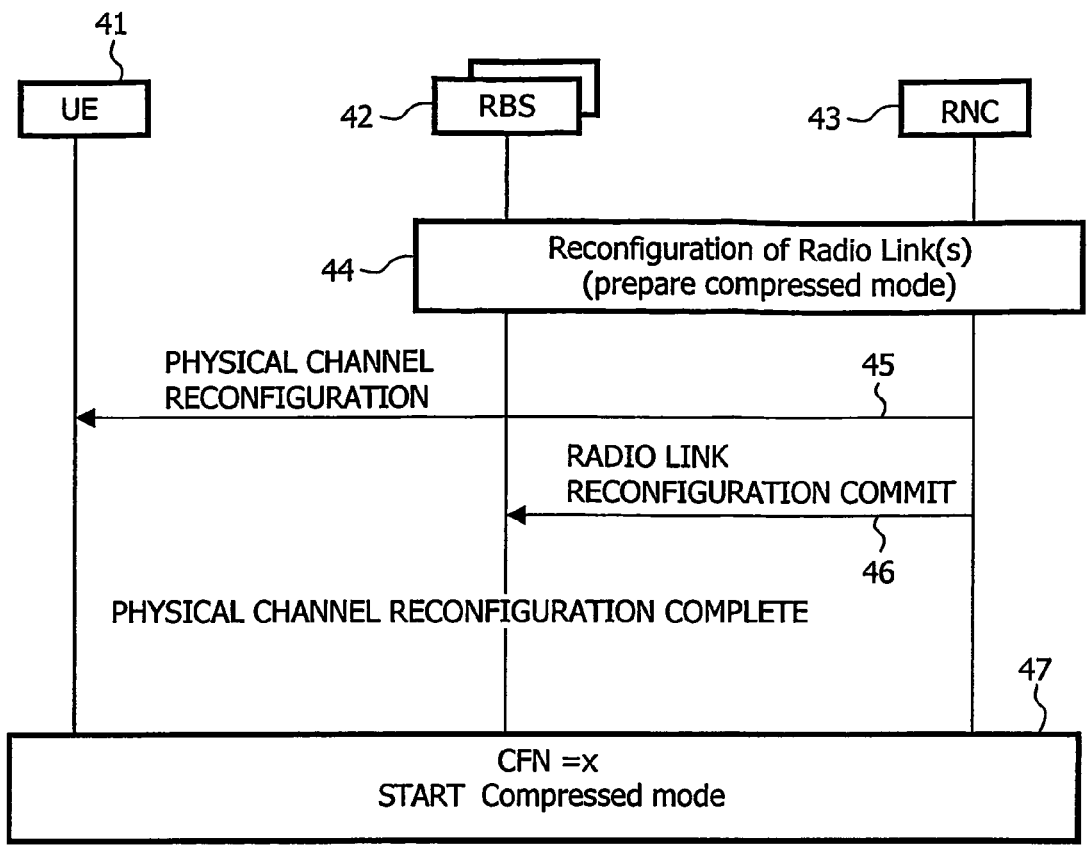
FIG. 4 shows a reconfiguration process.

FIG. 4 shows a reconfiguration process. A mobile unit (or user equipment UE) 41, a number of base stations RBS 42 and a network controller 43 are a in communication process indicated by timelines in downward direction. At an instant a reconfiguration 44 of radio links is communicated by messages, for example as described in TS25.433 in the Synchronised Radio Link Reconfiguration Preparation procedure. The procedure includes sending a physical channel reconfiguration message 45 and a radio link reconfiguration commit message 46, the latter indicating a future selected time code to be matched by the time codes CFN from the synchronization counter, indicated as CFN=x. A Prepared Reconfiguration exists when the Synchronised Radio Link Reconfiguration Preparation procedure has been completed successfully. The Prepared Reconfiguration does not exist any more after either of the procedures Synchronised Radio Link Reconfiguration Commit or Synchronised Radio Link Reconfiguration Cancellation has been completed, i.e. until the future selected time code has passed (or reconfiguration cancelled). The completion of the reconfiguration process is indicated at instant 47 at CFN=x. In the example shown the compressed mode is then actually started.

Figure 5A:
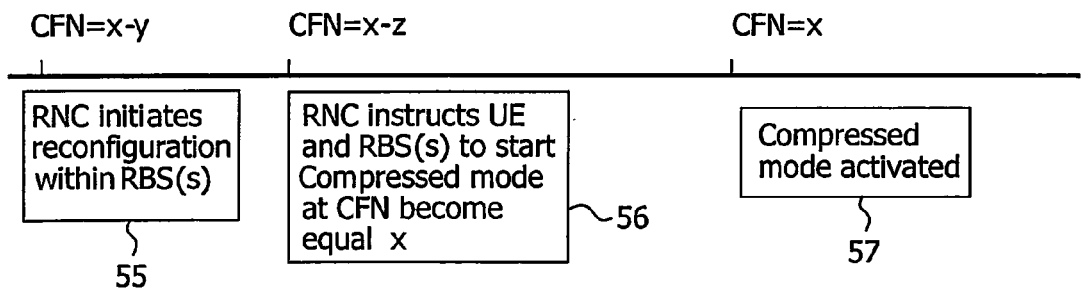
FIG. 5a shows starting a compressed mode.

FIG. 5 shows examples of a reconfiguration of the compressed mode. In FIG. 5a the compressed mode is started. In a first step 55, at CFN=x−y, the network controller RNC initiates the reconfiguration in one or more of the base stations RBS(s). In a second step 56, at CFN=x−z, the RNC instructs the UE and RBS(s) to start the compressed mode at CFN become equal to x. In a third step 57, at CFN=x, the compressed mode is started both in the UE and the RBS(s).

The time frame between instructing the RBS(s) and the UE to start Compressed Mode shall be long enough (typically z=50) to allow all nodes to prepare for activation of compressed mode (CPM). The period from the time (CFN=x−z) that all nodes instructed to start compressed mode until CFN becomes equal to value x is traditionally called a blocking period. During the blocking period it is not possible to add a radio link to an active configuration via a not yet involved base station. In the prior art system problems arise if the new radio link would be activated during the blocking period. For example a CPM pattern staring at CFN=x has gaps in the first and third frame and pattern repeats every 8 frames. When activating an new link before CFN=x the new involved RBS will immediately start in compressed mode and produce gaps at CFN=x−5, x−8, x−13, x−16 . . . . Hence the new radio link would be producing gaps while the existing radio link(s) are not yet switched to compressed mode, which would lead to air interference.

Figure 5B:
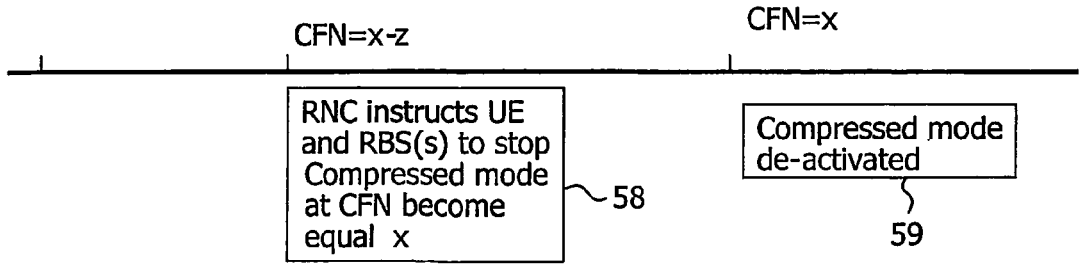
FIG. 5b shows stopping a compressed mode.

FIG. 5b shows stopping a compressed mode. In a first step 58, send at CFN=x−z, the RNC instructs the UE and RBS(s) to stop the compressed mode when CFN becomes equal to x. In a second step 59, at CFN=x, the compressed mode is deactivated both in the UE and the RBS(s). Similar problems to starting occur when the compressed mode is stopped.

For stopping compressed mode and adding a radio link between CFN=x-z and CFN=x one only has two problematic options:
a) Add radio link without starting compressed mode. The new radio link will not produce the gaps while the other radio link(s) will until CFN becomes equal x. In the time frame (blocking) radio reception will be corrupted.
b) Start compressed mode at establishment. The new radio link is started with compressed mode but must (after establishment) be instructed to stop the compressed mode. Most likely stopping the compressed mode will be (much) later then the other radio link(s) stop compressed mode. In the timeframe between CFN=x and new radio link stops compressed mode the radio reception will be corrupted as the new radio link will produce gaps, while the other radio links do not.

According to the invention a solution is provided. The solution lays in the fact that communication elements to be newly involved in a radio link configuration need to be made aware of the prepared reconfiguration, and the period until actual activation of the new configuration. Hence the period between transmission of the reconfiguration commit message (see e.g. message 46 in FIG. 4) and the future selected time code (traditionally named blocking period) is now considered to be a prepared reconfiguration period. The starting time is the transmission time of a reconfiguration preparation command 55, and the ending time is the completion of the reconfiguration procedure at the selected CFN=x. Hence first the prepared reconfiguration period is determined, which period starts at a transmission time code of the reconfiguration command, and ends at the selected future time code. Secondly, for any further change command for changing the configuration, a prepared reconfiguration period indicator is added to the change command. The information for setting the prepared reconfiguration, e.g. compressed mode parameters, may also be added to the change command, or may be transferred in a further additional command.

Figure 6:
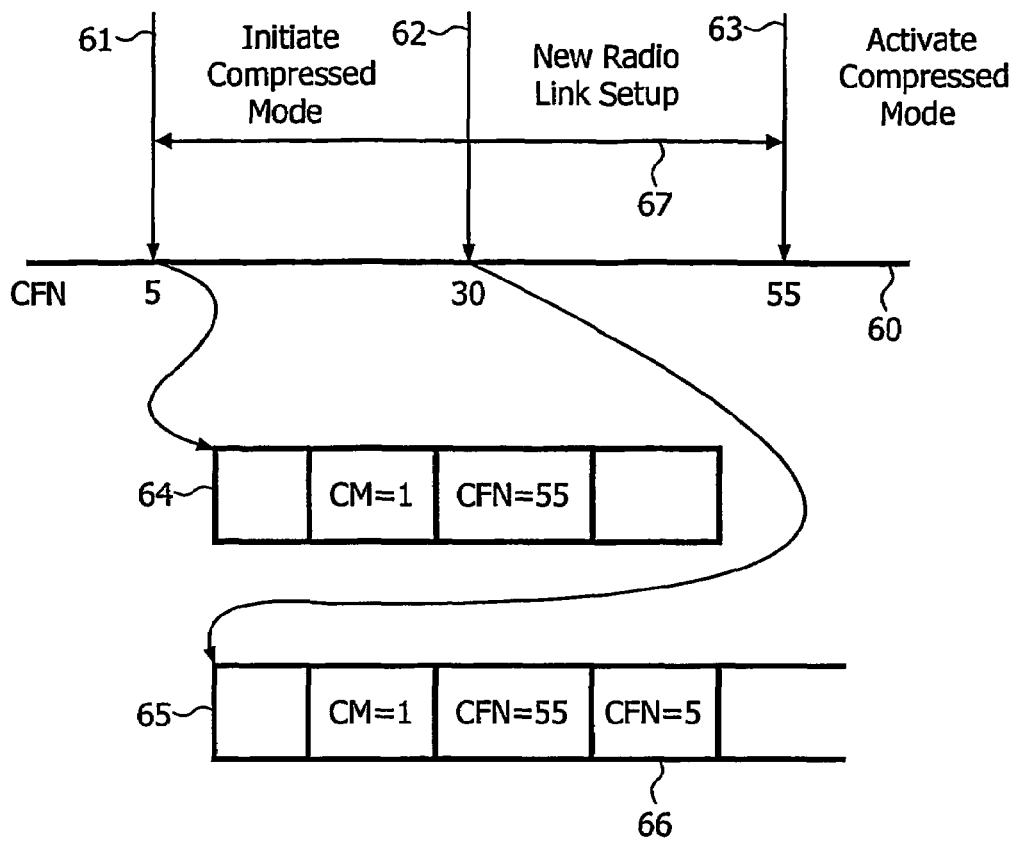
FIG. 6 shows messages including a prepared reconfiguration period indicator.

FIG. 6 shows messages including a prepared reconfiguration period indicator. A timeline 60 is shown having time codes in configuration frame numbers CFN. A first message 61 initiates the compressed mode, i.e. a new configuration, at CFN=5. Hence a prepared reconfiguration period 67 starts at transmission time CFN=5. The message is shown in detail 64, and includes a compressed mode indicator CM=1, and the future selected time code CFN=55 for activation, which is the CFN time code (at that moment not yet passed, i.e. in the future). An activation of the compressed mode is performed at completion time 63, which ends the prepared reconfiguration period 67. During the prepared reconfiguration period a new radio link setup message 62 is transferred at CFN=30. The message is shown in detail 65, and includes a compressed mode indicator CM=1. In addition, as a prepared reconfiguration period indicator 66 for indicating the prepared reconfiguration period 67, the message contains the future selected time code CFN=55 for activation of the compressed mode, and the transmission time CFN=5 of the reconfiguration message 61. Due to the latter two CFN time codes, the new communication elements that receive the message are aware if the compressed mode patterns are already started in other radio links or that reconfiguration is still waiting till CFN becomes equal to x.

In a practical embodiment the transmission time CFN=5 of the reconfiguration message is only added to the RADIO LINK SETUP REQUEST in the prepared reconfiguration period, i.e. adding the CFN value equal to the (start) CFN value at moment RNC 43 (in FIG. 4) sends the RECONFIGURATION COMMIT message while CFN has not yet passed value x. In other words, when sending RADIO LINK SETUP REQUEST during the (traditional) blocking period, this additional information is included. The RBS 42 can then evaluate if the RADIO LINK SETUP REQUEST (RLSR) is received during the blocking period.

It is to be noted that traditionally, for example as described in TS25.433, the change commands may already contain a reference configuration time code in an information part of the RLSR, called active pattern sequence information (APSI). Such reference time codes are strictly intended for synchronizing signal patterns or sequences, and constitute passed time codes. According to TS25.433, chapter 8.2.17.2 Successful Operation of the Radio Link Setup, if the RADIO LINK SETUP REQUEST message includes the Transmission Gap Pattern Sequence Information (TGPSI) and the APSI, the RBS shall use the information to immediately activate the indicated Transmission Gap Pattern Sequence(s) in the new Radio Link (RL). The received CM Configuration Change CFN refers to the latest passed CFN with that value. Sequences of transmission gaps are described in TGPSI and APSI, which may include further time references for starting repetitive sequences. Such detailed time codes are given with reference to the CM Configuration Change CFN. Hence the radio link is to be started in the indicated configuration (and therefore traditionally the radio link setup cannot be performed in the blocking period).

In an embodiment of the invention, the radio link setup message contains the prepared reconfiguration period indicator, and communication elements shall have to apply the information element (IE) 'CM Configuration Change CFN' in APSI first as a future CFN and not immediately start compressed mode. The RBS shall start compressed mode patterns in the future at CFN=x, i.e. aligned with the existing radio link(s). Secondly, after CFN=x has passed, the CM Configuration Change CFN provides the reference time code as explained above.

In practical embodiment the prepared reconfiguration period indicator is a flag, e.g. a single bit. However, in the UMTS system as described in TS25.433, the synchronization counter has a synchronization cycle indicated by a limited number of the time codes, e.g. a range of CFN=0 to CFN=255, and a frame length of 10 msec. Hence any CFN value may either be in the past or future. In particular, due to transmission delays, a message that is sent in the prepared reconfiguration period (e.g. at CFN=54) may be received just after that period (e.g. at CFN=56). If the message contained a CM Configuration Change CFN=55 and only a flag indicating the 'future' status, the receiving device would need to wait almost a full synchronization cycle until CFN=55 passes again. In an embodiment the prepared reconfiguration period indicator comprises the transmission time code of the reconfiguration commit message, which defines the prepared reconfiguration period in the synchronization cycle.

Figure 7:
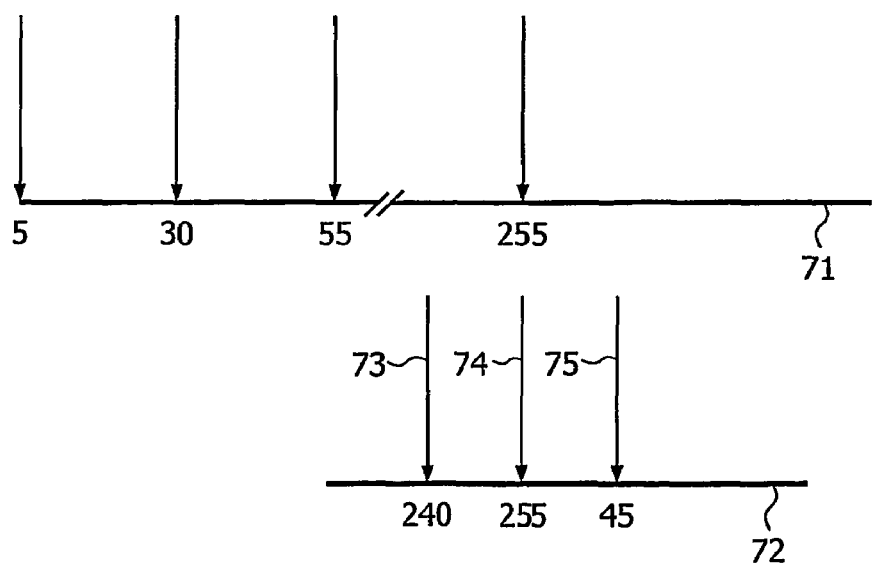
FIG. 7 shows a synchronization cycle.

FIG. 7 shows a synchronization cycle. On an upper timeline 71 the time code 255 indicates the end of the synchronization cycle, and the counter is reset to zero. Reconfiguration messages are transmitted and the reconfiguration process is performed similar to FIG. 6 at CFN=5, 30 and 55. In a lower time line a first message 73 initiates the compressed mode reconfiguration procedure at CFN=240. Hence the prepared reconfiguration period starts at transmission time CFN=240.

An activation 75 of the new configuration of the compressed mode is performed at CFN=45, i.e. in a next synchronization cycle. By including the transmission time CFN=240 in a change message 74 at CFN=255, the receiving device knows that the CM Configuration Change CFN=45 is still in the future, because the prepared reconfiguration period still is in progress.

In the example shown in FIG. 6 it is supposed that initiate compressed mode message is sent at a transmission time CFN=5. A new radio link is to be set up between 55>CFN>5, for example at CFN=30. The transmission time element, CFN=5, is added to the message according to the invention. The message also contains the value of the CFN=55 when Compressed Mode must become active. The RBS operates as follows. First a check is done for the presence of the transmission element (CFN=5). If the transmission CFN is not present then the CFN=55 is considered as passed and compressed mode is immediately started (traditional procedure). If the transmission CFN is present then:

- If the actual CFN is between 55>CFN>5 (as in this example CFN=30) then compressed mode is only started when CFN reaches the value 55;
- If the actual CFN is greater then 55 (for example when a new radio link setup message is sent just before compressed mode must become active, the message could arrive with some delay at the RBS, for example at CFN=56), then CFN=55 is considered as passed (old) and compressed mode is started immediately.

FIG. 8 shows a prepared reconfiguration period indicator in a change message. The change message is a practical example based on a Radio Link Setup Request (RLSR) message as described in TS25.433, and is given as a part of the tabular description in chapter 9.1.36.1 thereof. The standard message contains the fields (in the column IE/Group name) Transmission Gap Pattern Sequence Information, and Active Pattern Sequence Information, which provide the parameters of the radio link configuration in compressed mode. A prepared reconfiguration period indicator "Start CFN—RECONFIG" 81 is added to the standard message. The presence of the field depends on a condition "C-CPM" 83 (in the second column). The condition is true if the RLSR is sent in the prepared reconfiguration period. Hence no prepared reconfiguration period indicator is present in other periods. A further prepared reconfiguration period indicator "Stop CFN—RECONFIG" 81 may be added to the standard message. The presence of the field depends also on a condition "C-CPM" 83. The condition is true if the RLSR is send during compressed mode and in a prepared reconfiguration period, i.e. a reconfiguration period for stopping the compressed mode. It is noted that, alternatively, a single CFN parameter and a separate flag could be used to indicate the difference between starting and stopping a special configuration of which special configuration parameters are also included in the message.

In an embodiment the reconfiguration period indicator is selectively added to the change command for a mobile unit or base station not involved in the configuration change when issuing the reconfiguration command.

Figure 9:
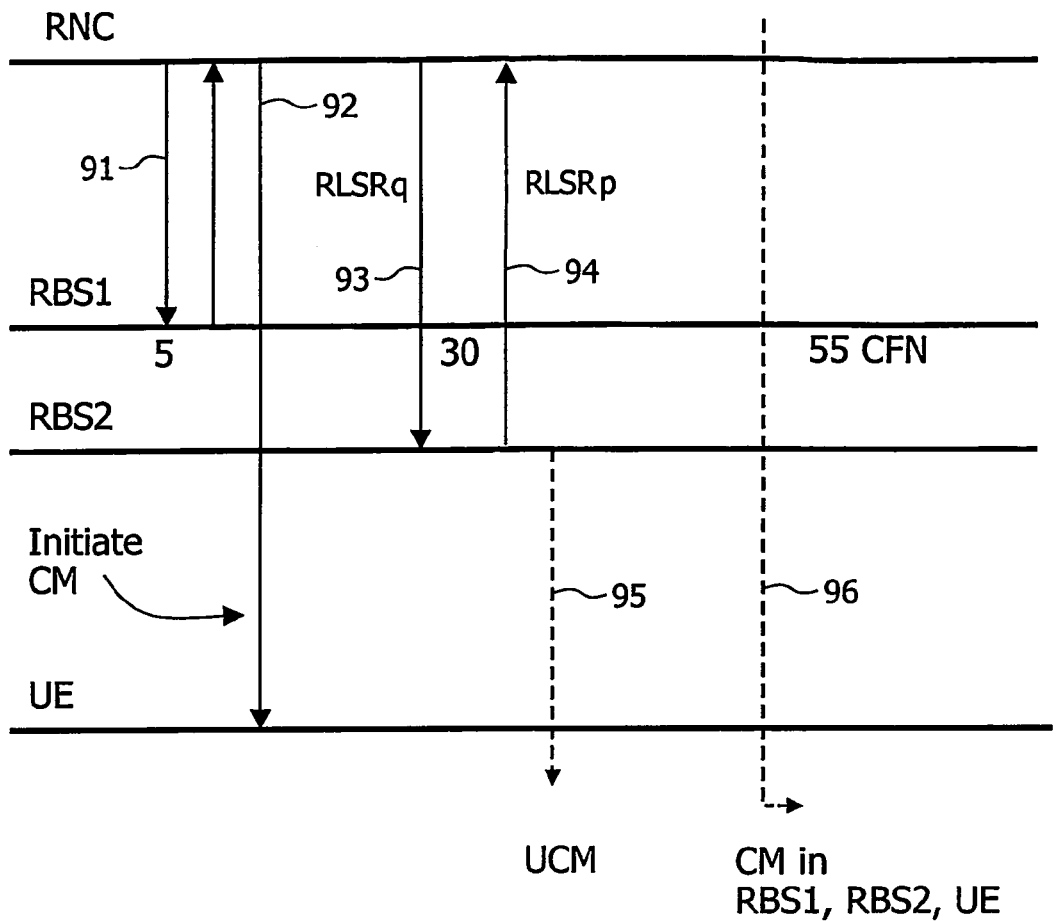
FIG. 9 shows a reconfiguration process and a change command for a not involved communication element.

FIG. 9 shows a reconfiguration process and a change command for a not involved communication element. A radio network controller RNC initiates, at CFN=5, a reconfiguration command 91, which is confirmed by a first base station RBS1 and further send to an involved mobile unit UE via a message 92. Hence a prepared reconfiguration period starts at CFN=5. However a second base station, which is not yet involved in the communication with UE, RNC is not aware of the upcoming reconfiguration. At a later time, CFN=30, a radio link setup request RLSRq 93, e.g. as described above with reference to FIG. 8, is send to RBS2. Due to the prepared reconfiguration period indicator 81 in the RLSRq, the RBS2 is aware that the prepared reconfiguration period is not yet passed. RBS2 sends a radio link setup response RLSRp message 94 to the RNC, and starts communication in uncompressed mode (UCM) 95 to the UE. Advantageously there is no need to wait. All communication elements switch to compressed mode (CM) 96 when the actual CFN is equal to the future selected time at CFN=55. It is noted that the second base station is communicating to the UE at the same frequencies as the first base station, and the UE receives both transmissions when going from the area of RBS1 to RBS2, which is also known as soft handover.

Figure 10:
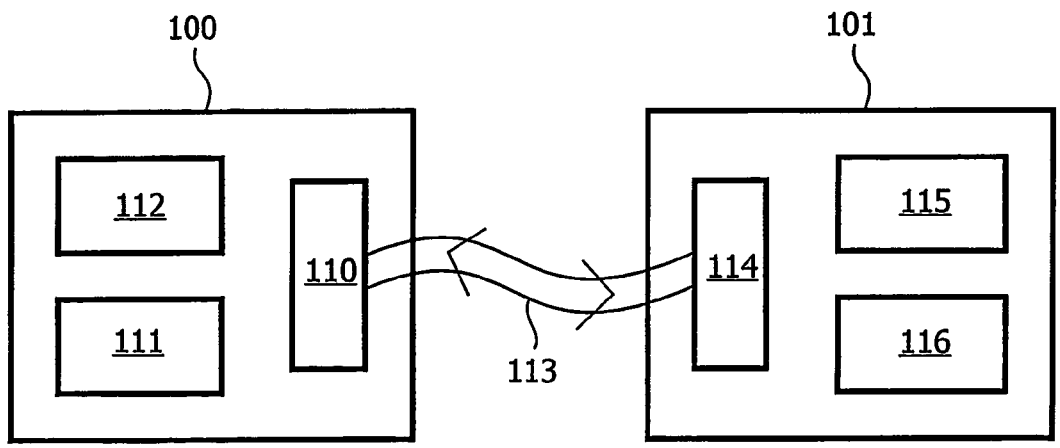
FIG. 10 shows a mobile unit and a base station.

FIG. 10 shows a mobile unit and a base station. A mobile unit 100 has a transmitter/receiver 110 providing a radio link 113 to a transmitter/receiver 114 in a base station 101. The transmitter/receivers 110,114 are provided with the usual radio transmission and receiving circuits, and with controller units for generating the messages to be transmitted and analyzing messages to be received as described above. The mobile unit has a synchronization counter 111, which is incremented at a predefined rate, and is synchronized with a similar synchronization counter 116 in the base station 101. The base station has a configuration controller 115 for transferring messages to the mobile unit and further communication elements in the radio network as shown in FIGS. 1 and 2, and the mobile unit 100 also has a configuration controller 112, for executing the reconfiguration procedures as described above.

The synchronization counters 111,116 have a synchronization cycle indicated by a limited number of the time codes, as explained with FIG. 7. A change command, e.g. a radio link setup request, may include a reference time code for providing a passed reference time in the synchronization cycle. In the change command the prepared reconfiguration period indicator is indicating that the reference time code is indicating the selected future time code. The configuration controller 112 detects whether the current time code from the synchronization counter 111 has passed the future selected time code. In particular it detects whether the current time code is in a part of the synchronization cycle covered by the prepared reconfiguration period.

Although the invention has been mainly explained by embodiments using the UMTS/WCDMA cellular communication system, the invention is also suitable for other communication systems having a cellular structure.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

What is claimed:

1. A cellular communication system, controlling a configuration of radio links in a radio network comprising a network controller, mobile units and base stations, the system being arranged for:

maintaining, in the mobile unit and in the base station, a synchronization counter indicating time codes for synchronization of functions across the system, transferring messages between the network controller, the base stations and the mobile units, the messages being transmitted at a transmission time code, the messages including
   a change command for changing a configuration of radio links, and
   a reconfiguration command for changing a current configuration state of the configuration of radio links to a next configuration state of the configuration of radio links at a selected future time code, which configuration change involves at least one mobile unit and at least one base station,
determining a prepared reconfiguration period, which period starts at the transmission time code of the change command, and ends at the selected future time code, and
during the prepared reconfiguration period sending a new change command, which includes the future selected time code and the transmission time of the reconfiguration command, wherein network elements receiving the message are made aware of the reconfiguration status.

2. The system as claimed in claim 1, wherein the synchronization counter has a synchronization cycle indicated by a limited number of the time codes, and the change command comprises a reference time code for providing a reference time in the synchronization cycle, and the prepared reconfiguration period indicator is indicating that the reference time code is indicating the selected future time code.

3. The system as claimed in claim 1, wherein the prepared reconfiguration period indicator comprises the transmission time code of the reconfiguration command.

4. The system as claimed in claim 1, wherein the prepared reconfiguration period indicator is selectively added to the change command in the event that a change command is to be transferred in the prepared reconfiguration period.

5. The system as claimed in claim 1, wherein the prepared reconfiguration period indicator is selectively added to the change command for a mobile unit or base station not involved in the configuration change when issuing the reconfiguration command.

6. The system as claimed in claim 1, wherein the change command is a link change command for adding a radio link to the configuration.

7. The system as claimed in claim 1, wherein the changing the current configuration state to the next configuration state comprises changing a compressed transmission mode in a radio link.

8. A method of controlling a mobile unit or a base station in a cellular communication system, the cellular communication system controlling radio links in a radio network comprising a network controller, mobile units and base stations, the method comprising
   maintaining a synchronization counter indicating time codes for synchronization of functions across the system,
   transferring messages between the mobile unit and the base stations,
   detecting a prepared reconfiguration period indicator from the change command,
   during the prepared reconfiguration period sending a new change command, which includes the future selected time code and the transmission time of the reconfiguration command, wherein network elements receiving the message are made aware of the reconfiguration status;
   and, in the event that a future selected time code has not yet passed, at the future selected time code, configuring the radio links in the radio network according to a next configuration state.

9. The method as claimed in claim 8, further comprising, in the event that the future selected time code has not yet passed, executing the change command according to the current configuration state, and, in the event that the future selected time code has passed, executing the change command according to the next configuration state.

10. The method as claimed in claim 8, wherein the synchronization counter has a synchronization cycle indicated by a limited number of time codes, the change command comprises a reference time code for providing a passed reference time in the synchronization cycle, and
   the prepared reconfiguration period indicator is indicating that the reference time code is indicating the selected future time code, the method further comprising
   detecting whether a current time code has passed the future selected time code, and detecting whether the current time code is in a part of the synchronization cycle covered by the prepared reconfiguration period.

11. A mobile unit for use in a cellular communication system including base stations the mobile unit comprising
   a synchronization counter indicating time codes for synchronization of functions across the system, and
   means for transferring messages between the mobile unit and the base stations, and
   reconfiguration means for
      sending a new change command during a prepared reconfiguration period, which includes the future selected time code and the transmission time of the reconfiguration command, wherein network elements receiving the message are made aware of the reconfiguration status;
      detecting a prepared reconfiguration period indicator from the change command and, in the event that a future selected time code has not yet passed,
      setting the configuration according to a next configuration state at the future selected time code.

12. The mobile unit as claimed in claim 11, wherein the reconfiguration means are arranged for, in the event that the future selected time code has not yet passed, executing the change command according to the current configuration state, and in the event that the future selected time code has passed, for executing the change command according to the next configuration state.

13. The mobile unit as claimed in claim 11, wherein the synchronization counter has a synchronization cycle indicated by a limited number of the time codes, and the change command comprises a reference time code for providing a passed reference time in the synchronization cycle, and the prepared reconfiguration period indicator is indicating that the reference time code is indicating the selected future time code, and the reconfiguration means are arranged for, in order to detect whether a current time code has passed the future selected time code, detecting whether the current time code is in a part of the synchronization cycle covered by the prepared reconfiguration period.

14. A device for controlling a base station in a cellular communication system comprising mobile units, the device comprising
   a synchronization counter indicating time codes for synchronization of functions across the system,
   transmission means for transferring messages between the base station and the mobile units,
   reconfiguration means
      for detecting a prepared reconfiguration period indicator from a change command and
      for sending a new change command during a prepared reconfiguration period, which includes the future selected time code and the transmission time of the reconfiguration command, wherein network elements receiving the message are made aware of the reconfiguration status; and, in the event that a future selected time code has not yet passed, at the future selected time code setting the configuration according to a next configuration state.

15. The device as claimed in claim 14, wherein the reconfiguration means are arranged for, in the event that the future selected time code has not yet passed, executing the change command according to the current configuration state, and for, in the event that the future selected time code has passed, executing the change command according to the next configuration state.

16. The device as claimed in claim 14, wherein the synchronization counter has a synchronization cycle indicated by a limited number of the time codes, and the change command comprises a reference time code for providing a reference time in the synchronization cycle, and the prepared reconfiguration period indicator is indicating that the reference time code is indicating the selected future time code, and the reconfiguration means are arranged for, in order to detect whether a current time code has passed the future selected time code, detecting whether the current time code is in a part of the synchronization cycle covered by the prepared reconfiguration period.

* * * * *